United States Patent
Shigemitsu

(10) Patent No.: US 10,676,602 B2
(45) Date of Patent: Jun. 9, 2020

(54) GOLF BALL RESIN COMPOSITION AND GOLF BALL

(71) Applicant: Dunlop Sports Co. Ltd., Kobe-shi, Hyogo (JP)

(72) Inventor: Takahiro Shigemitsu, Kobe (JP)

(73) Assignee: SUMITOMO RUBBER INDUTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/812,585

(22) Filed: Nov. 14, 2017

(65) Prior Publication Data

US 2018/0171128 A1 Jun. 21, 2018

(30) Foreign Application Priority Data

Dec. 21, 2016 (JP) ................. 2016-248155

(51) Int. Cl.
| | |
|---|---|
| C08L 23/08 | (2006.01) |
| C08L 77/00 | (2006.01) |
| C08K 5/098 | (2006.01) |
| A63B 37/00 | (2006.01) |
| C08L 31/04 | (2006.01) |
| C08L 77/06 | (2006.01) |
| C08L 77/02 | (2006.01) |

(52) U.S. Cl.
CPC ...... C08L 23/0876 (2013.01); A63B 37/0039 (2013.01); A63B 37/0043 (2013.01); A63B 37/0048 (2013.01); A63B 37/0049 (2013.01); A63B 37/0075 (2013.01); A63B 37/0076 (2013.01); C08L 31/04 (2013.01); C08L 77/06 (2013.01); C08L 77/02 (2013.01)

(58) Field of Classification Search
None
See application file for complete search history.

(56) References Cited

U.S. PATENT DOCUMENTS

| | | | | |
|---|---|---|---|---|
| 6,011,115 A | * | 1/2000 | Miharu | C08L 23/08 428/34.1 |
| 6,100,321 A | * | 8/2000 | Chen | A63B 37/0094 473/357 |
| 6,838,501 B2 | * | 1/2005 | Takesue | A63B 37/0003 473/351 |
| 2002/0099120 A1 | | 7/2002 | Takesue et al. | |
| 2003/0134954 A1 | * | 7/2003 | Takesue | C08K 5/09 524/394 |
| 2003/0224874 A1 | | 12/2003 | Takesue et al. | |
| 2005/0197427 A1 | * | 9/2005 | Nagasawa | A63B 37/0024 523/201 |
| 2009/0253534 A1 | | 10/2009 | Egashira et al. | |
| 2009/0270203 A1 | | 10/2009 | Okabe | |
| 2010/0167841 A1 | * | 7/2010 | Okabe | A63B 37/0003 473/373 |
| 2015/0119167 A1 | * | 4/2015 | Inoue | A63B 37/0094 473/373 |

FOREIGN PATENT DOCUMENTS

| | | |
|---|---|---|
| JP | 2002-219195 A | 8/2002 |
| JP | 2003-339910 A | 12/2003 |
| JP | 2009-247891 A | 10/2009 |
| JP | 2009-261791 A | 11/2009 |

* cited by examiner

Primary Examiner — David J Buttner
(74) Attorney, Agent, or Firm — Birch, Stewart, Kolasch & Birch, LLP

(57) ABSTRACT

An object of the present invention is to provide a material from which a golf ball having excellent resilience and durability can be obtained. The present invention provides a golf ball resin composition containing: (A) at least one member selected from the group consisting of a polyamide, an ethylene-vinyl alcohol copolymer, a partially saponified product of an ethylene-vinyl acetate copolymer, and a polyvinyl alcohol, (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a fatty acid metal salt having 18 or less carbon atoms.

16 Claims, 1 Drawing Sheet

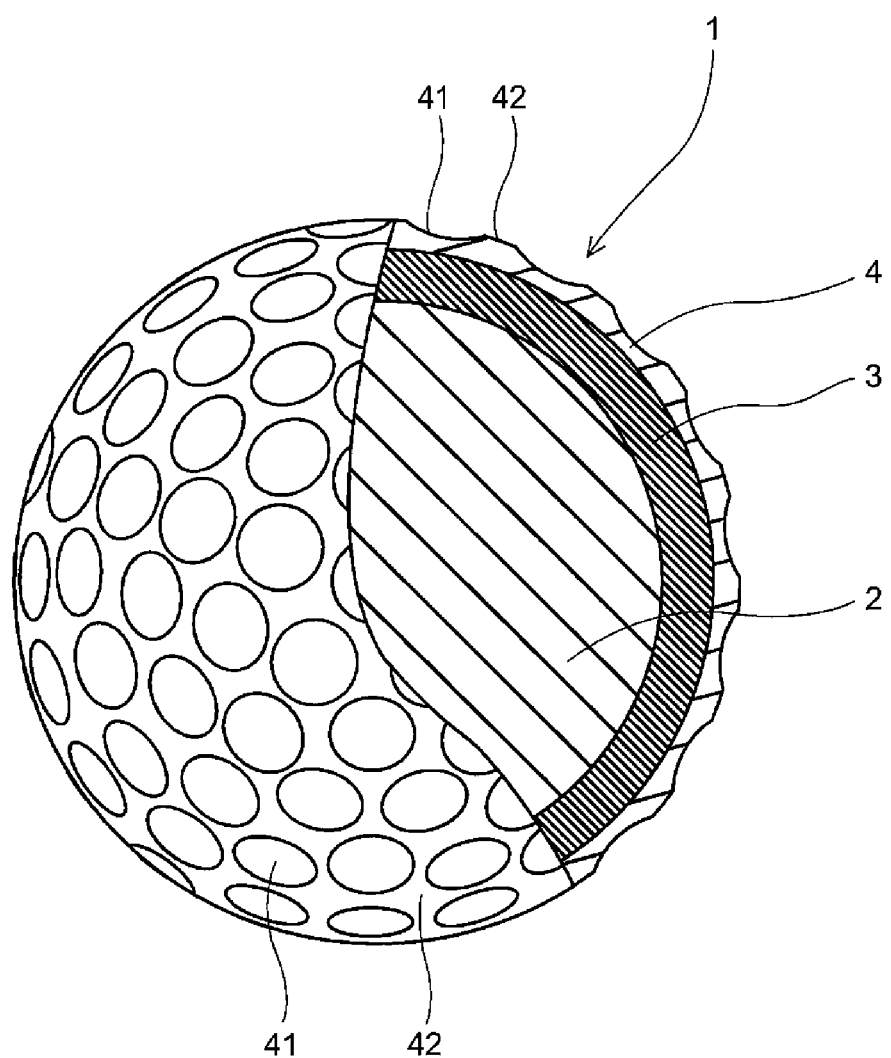

GOLF BALL RESIN COMPOSITION AND GOLF BALL

FIELD OF THE INVENTION

The present invention is directed to a technology relating to a golf ball resin composition, and more specifically, a technology relating to an improvement of durability and resilience.

DESCRIPTION OF THE RELATED ART

Conventionally, not only great flight distance but also excellent durability is required for a golf ball. As the material used for such a golf ball, a golf ball resin material which is obtained by performing various improvements to an ionomer resin has been proposed.

For example, Japanese Patent Publication No. 2009-247891 A discloses a golf ball material containing the following components as essential components: (A) an oxygen-containing inorganic metal compound, (B) one or at least two polymers selected from the group consisting of multi-component copolymer polyamides, and (C) one or at least two acid-containing polymers having an acid content in a range from 0.5 to 30 mass % selected from the group consisting of an olefin-unsaturated carboxylic acid binary copolymer, an olefin-unsaturated carboxylic acid-unsaturated carboxylic acid ester ternary copolymer, an unsaturated carboxylic anhydride-containing polymer, an unsaturated dicarboxylic acid-containing polymer and an unsaturated dicarboxylic acid half ester-containing polymer.

Japanese Patent Publication No. 2009-261791 A discloses a golf ball comprising a core consisting of a center and one or more intermediate layers covering the center, and a cover covering the core, wherein at least one piece or one layer of the intermediate layers is formed from a highly elastic intermediate layer composition containing: (A) a highly elastic resin having a flexural modulus in a range from 700 MPa to 5000 MPa, and (B) an ionomer resin having a flexural modulus in a range from 150 MPa to 1000 MPa, wherein a ratio of an amount of (A) the highly elastic resin to an amount of (B) the ionomer resin (totally 100 mass %), i.e. (A) the highly elastic resin/(B) the ionomer resin, is (20 mass % to 80 mass %)/(80 mass % to 20 mass %).

In addition, in order to obtain a thin constituent member or improve workability, good moldability (fluidity) is required for a golf ball resin material. As the technology for improving the fluidity of the golf ball resin material, a fatty acid or a metal salt thereof is added as disclosed in Japanese Patent Publications No. 2002-219195 A and No. 2003-339910 A.

Japanese Patent Publication No. 2002-219195 A discloses a golf ball material comprising a mixture which is composed of: 100 parts by weight of a resinous component consisting essentially of a base resin having (a) an olefin-unsaturated carboxylic acid binary random copolymer or a metal ion-neutralized olefin-unsaturated carboxylic acid binary random copolymer or both, blended with (b) an olefin-unsaturated carboxylic acid-unsaturated carboxylate ternary random copolymer or a metal ion-neutralized olefin-unsaturated carboxylic acid-unsaturated carboxylate ternary random copolymer or both, in a weight ratio of 100:0 to 25:75, and (e) a non-ionomer thermoplastic elastomer, said base resin and said elastomer being blended in a weight ratio of 100:0 to 50:50; (c) 5 to 80 parts by weight of a fatty acid or fatty acid derivative or both, having a molecular weight of 280 to 1,500; and (d) 0.1 to 10 parts by weight of a basic inorganic metal compound capable of neutralizing acidic groups left unneutralized in the base resin and component (c).

In addition, Japanese Patent Publication No. 2003-339910 A discloses a golf ball comprising a core and a cover of one or more layers enclosing the core, wherein at least one layer of the cover is formed primarily of a mixture comprising a blend of (a) an ionomer resin in the form of a divalent metal-neutralized ethylene-acrylic acid copolymer and (b) an olefin-unsaturated carboxylic acid copolymer or an olefin-unsaturated carboxylic acid-unsaturated carboxylate copolymer in a weight ratio (a)/(b) of from 100/0 to 80/20, (c) a thermoplastic elastomer selected from the group consisting of an olefin base thermoplastic elastomer, styrene base thermoplastic elastomer, polyester base thermoplastic elastomer, polyurethane base thermoplastic elastomer, and polyamide base thermoplastic elastomer, the blend and the thermoplastic elastomer (c) being mixed in a weight ratio [(a)+(b)]/(c) of from 100/0 to 50/50, (d) a fatty acid or derivative thereof having a molecular weight of 280 to 1,500 in a weight ratio [(a)+(b)+(c)]/(d) of from 100/5 to 100/25, and (e) a basic metal compound in a weight ratio [(a)+(b)+(c)]/(e) of from 100/0.1 to 100/10.

SUMMARY OF THE INVENTION

Japanese Patent Publications No. 2009-247891 A and No. 2009-261791 A discloses an attempt to improve durability by containing other resin components in an ionomer resin, however, it cannot be said that the obtained material has sufficient durability, and there still remains room for improvement. In addition, Japanese Patent Publications No. 2002-219195 A and 2003-339910 A discloses an attempt to achieve fluidity improvement effect by adding a fatty acid or a metal salt thereof in a golf ball resin material, however, the obtained golf ball shows lowered resilience and durability since a large quantity of fatty acid or metal salt thereof was used.

The present invention has been achieved in view of the above problems. An object of the present invention is to provide a golf ball resin composition imparting excellent resilience and durability to a golf ball. Another object of the present invention is to provide a golf ball having excellent resilience and durability.

The present invention that has solved the above problems provides a golf ball resin composition containing: (A) at least one member selected from the group consisting of a polyamide, an ethylene-vinyl alcohol copolymer, a partially saponified product of an ethylene-vinyl acetate copolymer, and a polyvinyl alcohol, (B) at least one resin component selected from the group consisting of (b-1) a binary copolymer composed of an olefin and an $\alpha,\beta$-unsaturated carboxylic acid having 3 to 8 carbon atoms, (b-2) a metal ion-neutralized product of a binary copolymer composed of an olefin and an $\alpha,\beta$-unsaturated carboxylic acid having 3 to 8 carbon atoms, (b-3) a ternary copolymer composed of an olefin, an $\alpha,\beta$-unsaturated carboxylic acid having 3 to 8 carbon atoms and an $\alpha,\beta$-unsaturated carboxylic acid ester, and (b-4) a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester, and (C) a fatty acid metal salt having 18 or less carbon atoms.

The golf ball according to the present invention comprises a core, one or more intermediate layers covering the core, and a cover covering the one or more intermediate layers, wherein at least one layer of the intermediate layers is formed from the above-described golf ball resin composition.

If the golf ball resin composition according to the present invention is used, a golf ball having excellent resilience and durability is obtained.

BRIEF DESCRIPTION OF THE DRAWINGS

The FIGURE is a partially cutaway sectional view showing a golf ball according to an embodiment of the present invention.

DESCRIPTION OF THE PREFERRED EMBODIMENT (1) Golf Ball Resin Composition

The present invention provides a golf ball resin composition containing: (A) at least one member selected from the group consisting of a polyamide, an ethylene-vinyl alcohol copolymer, a partially saponified product of an ethylene-vinyl acetate copolymer, and a polyvinyl alcohol, (B) at least one resin component selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester, and (C) a fatty acid metal salt having 18 or less carbon atoms.

First, the component (A) used in the present invention will be explained.

The polyamide used as the component (A) is not particularly limited, as long as it is a polymer having a plurality of amide bonds (—NH—CO—) in the main chain. Examples of the polyamide include a product having amide bonds in the molecule, formed by a ring-opening polymerization of lactam, a condensation reaction of amino acids, or a condensation reaction between a diamine component and a dicarboxylic acid component.

Examples of the lactam include ε-caprolactam, undecanelactam, lauryllactam and the like. Examples of the amino acid include 6-aminocaproic acid, 11-aminoundecanoic acid, 12-aminododecanoic acid, para-aminomethyl benzoic acid and the like.

Examples of the diamine component include an aliphatic diamine, an aromatic diamine and an alicyclic diamine. Examples of the aliphatic diamine include tetramethylene diamine, hexamethylene diamine, 2-methylpentamethylene diamine, undecamethylene diamine, dodecamethylene diamine, 2,2,4-trimethylhexamethylene diamine, 2,4,4-trimethylhexamethylene diamine, and 5-methylnonamethylene diamine. Examples of the aromatic diamine include metaxylylene diamine and para-xylylene diamine. Examples of the alicyclic diamine include 1,3-bis(aminomethyl) cyclohexane, 1,4-bis(aminomethyl) cyclohexane, 1-amino-3-aminomethyl-3,5,5-trimethyl cyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethyl piperazine.

Examples of the dicarboxylic acid component include an aliphatic dicarboxylic acid, an aromatic dicarboxylic acid, and an alicyclic dicarboxylic acid. Examples of the aliphatic dicarboxylic acid include adipic acid, suberic acid, azelaic acid, sebacic acid, and dodecane dicarboxylic acid. Examples of the aromatic dicarboxylic acid include terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid. Examples of the alicyclic dicarboxylic acid include 1,4-cyclohexanedicarboxylic acid.

Examples of the polyamide include an aliphatic polyamide, semi-aromatic polyamide and aromatic polyamide. Examples of the aliphatic polyamide include polyamide 6, polyamide 11, polyamide 12, polyamide 66, polyamide 610, and polyamide 612. Examples of the semi-aromatic polyamide include polyamide 6T, polyamide 6I, polyamide 9T, and polyamide MST. Examples of the aromatic polyamide include poly-p-phenylene terephthalamide, and poly-m-phenylene isophthalamide. These polyamides may be used solely, or two or more of them may be used in combination. Among them, the aliphatic polyamide is preferred, and polyamide 6, polyamide 66, polyamide 610, polyamide 11, and polyamide 12 are particularly suitable, from the viewpoint of processability and durability.

Examples of the polyamide include "Rilsan (registered trademark) A (e.g. AESN TL, AESN P20 TL, AESN P40 TL, MA3610, AMF O, AMN O, AMN O TLD, AMN AK TLD, AMN P20 D, and AMN P40 D)" available from Arkema Inc., "Novamid (registered trademark) (e.g. 1010C2, 1011CH5, 1013C5, 1010N2, 1010N2-2, 1010N2-1ES, 1013G (H) 10-1, 1013G (H) 15-1, 1013G (H) 20-1, 1013G (H) 30-1, 1013 (H) 45-1, 1015G33, 1015GH35, 1015GSTH, 1010GN2-30, 1015F2, ST220, ST145, 3010SR, 3010N5-SL4, 3021G (H) 30, and 3010GN30)" available from DSM Engineering Plastics Corporation, and "Amilan (registered trademark) (e.g. CM1007, CM1017, CM1017XL3, CM1017K, CM1026, CM3007, CM3001-N, CM3006, and CM3301L)" available from Toray Industries Inc.

The flexural modulus (ISO178) of the polyamide is preferably 500 MPa or more, more preferably 520 MPa or more, even more preferably 550 MPa or more, and most preferably 2,500 MPa or more, and is preferably 4,000 MPa or less, more preferably 3,500 MPa or less, and even more preferably 3,200 MPa or less. If the flexural modulus of the polyamide is 500 MPa or more, the obtained golf ball constituent member has high elasticity. In addition, if the flexural modulus of the polyamide is 4,000 MPa or less, the obtained golf ball constituent member does not become excessively hard and thus the shot feeling is better.

The slab hardness of the polyamide is preferably 55 or more, more preferably 60 or more, and even more preferably 65 or more in Shore D hardness, and is preferably 90 or less, more preferably 87 or less, and even more preferably 85 or less in Shore D hardness. If the slab hardness is 55 or more in Shore D hardness, the hardness of the layer formed from the resin composition is increased and thus the golf ball has greater low spin rate effect, and if the slab hardness is 90 or less in Shore D hardness, the hardness of the layer formed from the resin composition does not become excessively hard and thus the golf ball has better shot feeling.

The MFR (ISO113) (260° C., 325 gf) of the polyamide is preferably 5 g/min or more, more preferably 8 g/min or more, and even more preferably 20 g/min or more, and is preferably 170 g/min or less, more preferably 150 g/10 min or less, and even more preferably 120 g/10 min or less. If the MFR (260° C., 325 gf) of the polyamide is 5 g/10 min or more, the fluidity is better and thus the golf ball constituent member is easily molded. In addition, if the MFR (260° C., 325 gf) of the polyamide is 170 g/10 min or less, the obtained golf ball has better durability.

The degree of polymerization of the polyamide is not particularly limited. The relative viscosity of the polyamide, measured by a method in accordance with ISO307, is preferably in a range from 1.5 to 5.0, and more preferably in a range from 2.0 to 4.0.

As the polyamide, for example, a polyamide having coexisting crystalline form and amorphous form is preferable. In this case, the degree of crystallinity of the polyamide is preferably 5% or more, more preferably 6% or more, and even more preferably 6.5% or more, and is preferably 15% or less, more preferably 14% or less, and even more preferably 13% or less. The degree of crystallinity X can be calculated according to the following formula.

$$X=\{dc(d-da)\}/\{d(dc-da)\}$$

Herein, dc: density of crystalline form, da: density of amorphous form, d: density of sample.

The ethylene-vinyl alcohol copolymer used as the component (A) is not particularly limited, as long as it has a repeating unit derived from ethylene and a repeating unit derived from vinyl alcohol as a repeating unit. The ethylene-vinyl alcohol copolymer, for example, is represented by the following chemical formula (1).

[Chemical formula 1]

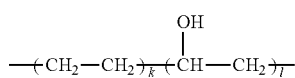

In the chemical formula (1), k represents number of the repeating unit derived from ethylene, and l represents number of the repeating unit derived from vinyl alcohol.

Examples of the ethylene-vinyl alcohol copolymer include a copolymer consisting of the repeating unit derived from ethylene and the repeating unit derived from vinyl alcohol; and a copolymer further including another repeating unit besides the repeating unit derived from ethylene and the repeating unit derived from vinyl alcohol. When the ethylene-vinyl alcohol copolymer further includes another repeating unit, the amount of another repeating unit in the total repeating units of the ethylene-vinyl alcohol copolymer is preferably 20 mole % or less, more preferably 10 mole % or less, and even more preferably 5 mole % or less. It is noted that the ethylene-vinyl alcohol copolymer used in the present invention preferably consists of the repeating unit derived from ethylene and the repeating unit derived from vinyl alcohol.

The amount of the repeating unit derived from ethylene in the ethylene-vinyl alcohol copolymer is preferably 15 mole % or more, more preferably 20 mole % or more, and even more preferably 25 mole % or more, and is preferably 60 mole % or less, more preferably 55 mole % or less, and even more preferably 50 mole % or less. If the amount of the repeating unit derived from ethylene falls within the above range, the ethylene-vinyl alcohol copolymer has desirable thermoplasticity, and the melt kneading of the ethylene-vinyl alcohol copolymer with the ionomer becomes easier.

Examples of the ethylene-vinyl alcohol copolymer include a fully saponified product (the degree of saponification thereof is 100 mole %) obtained by fully saponifying a copolymer composed of ethylene and vinyl ester (e.g. vinyl acetate). Specific examples of the ethylene-vinyl alcohol copolymer include Soarlite™ available from The Nippon Synthetic Chemical Industry Co., Ltd.

The partially saponified product of the ethylene-vinyl acetate copolymer used as the component (A) is not particularly limited, as long as it has a repeating unit derived from ethylene, a repeating unit derived from vinyl acetate and a repeating unit derived from vinyl alcohol.

The partially saponified product of the ethylene-vinyl acetate copolymer can be represented by the following chemical formula (2).

[Chemical formula 2]

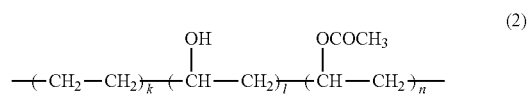

In the chemical formula (2), k represents number of the repeating unit derived from ethylene, l represents number of the repeating unit derived from vinyl alcohol, and n represents number of the repeating unit derived from vinyl acetate.

Examples of the partially saponified product of the ethylene-vinyl acetate copolymer include a copolymer consisting of the repeating unit derived from ethylene, the repeating unit derived from vinyl acetate and the repeating unit derived from vinyl alcohol; and a copolymer further including other repeating unit besides the repeating unit derived from ethylene, the repeating unit derived from vinyl acetate and the repeating unit derived from vinyl alcohol. When the partially saponified product of the ethylene-vinyl acetate copolymer further includes another repeating unit, the amount of another repeating unit in the total repeating units of the partially saponified product of the ethylene-vinyl acetate copolymer is preferably 20 mole % or less, more preferably 10 mole % or less, and even more preferably 5 mole % or less. It is noted that the partially saponified product of the ethylene-vinyl acetate copolymer used in the present invention preferably consists of the repeating unit derived from ethylene, the repeating unit derived from vinyl acetate and the repeating unit derived from vinyl alcohol.

Examples of the partially saponified product of the ethylene-vinyl acetate copolymer include a product having a degree of saponification of less than 100 mole %, obtained by partially saponifying an ethylene-vinyl acetate copolymer. The repeating unit derived from vinyl alcohol is generated from the repeating unit derived from vinyl acetate by the saponification.

The amount of vinyl acetate in the ethylene-vinyl acetate copolymer before the saponification for forming the partially saponified product of the ethylene-vinyl acetate copolymer is preferably 1 mass % or more, more preferably 2 mass % or more, and even more preferably 3 mass % or more, and is preferably 50 mass % or less, more preferably 45 mass % or less, and even more preferably 42 mass % or less. In addition, the partially saponified product of the ethylene-vinyl acetate copolymer preferably has a degree of saponification of 10 mole % or more, more preferably 15 mole % or more, and even more preferably 20 mole % or more, and preferably has a degree of saponification of 98 mole % or less, more preferably 95 mole % or less, and even more preferably 90 mole % or less.

The bending stiffness of the ethylene-vinyl alcohol copolymer or the partially saponified product of the ethylene-vinyl acetate copolymer is preferably 300 MPa or more, more preferably 310 MPa or more, even more preferably 400 MPa or more, and most preferably 600 MPa or more, and is preferably 5000 MPa or less, more preferably 4900 MPa or less, and even more preferably 4800 MPa or less. If the bending stiffness is 300 MPa or more, the layer formed from the resin composition has higher stiffness and thus the golf ball shows a lower spin rate. In addition, if the bending stiffness is 5000 MPa or less, the obtained golf ball constituent member does not become excessively hard and thus the shot feeling is better.

The slab hardness of the ethylene-vinyl alcohol copolymer or the partially saponified product of the ethylene-vinyl acetate copolymer is preferably 55 or more, more preferably 60 or more, and even more preferably 65 or more in Shore D hardness, and is preferably 90 or less, more preferably 88 or less, and even more preferably 85 or less in Shore D hardness. If the slab hardness is 55 or more in Shore D hardness, the layer formed from the resin composition has higher hardness and thus the golf ball shows a lower spin rate. In addition, if the slab hardness is 90 or less in Shore D hardness, the layer formed from the resin composition does not become excessively hard and thus the golf ball has better shot feeling.

The polyvinyl alcohol used as the component (A) is preferably a compound represented by the following chemical formula (3) or the following chemical formula (4).

[Chemical formula 3]

(3)

In the chemical formula (3), l represents number of the repeating unit derived from vinyl alcohol.

[Chemical formula 4]

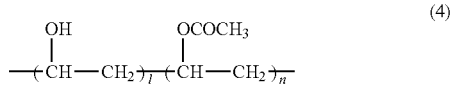

(4)

In the chemical formula (4), l represents number of the repeating unit derived from vinyl alcohol, and n represents number of the repeating unit derived from vinyl acetate.

Examples of the polyvinyl alcohol represented by the chemical formula (3) include a product obtained by fully saponifying a polyvinyl ester (e.g. polyvinyl acetate). Examples of the polyvinyl alcohol represented by the chemical formula (4) include a product (partially saponified product or fully saponified product) obtained by partially or fully saponifying a polyvinyl ester (e.g. polyvinyl acetate).

The degree of saponification of the polyvinyl alcohol represented by the chemical formula (4) is preferably 60 mole % or more, more preferably 80 mole % or more, even more preferably 90 mole % or more, and most preferably 95 mole % or more. The degree of saponification of the polyvinyl alcohol represented by the chemical formula (4) is less than 100 mole %.

It is noted that the degree of saponification can be measured according to JIS K 6726.

Specific examples of the polyvinyl alcohol include Gohsenol™ (N type (fully saponified type), A type (almost fully saponified type), G type (partially saponified type) and K type (partially saponified type) available from The Nippon Synthetic Chemical Industry Co., Ltd.

The component (A) is at least one member selected from the group consisting of a polyamide, an ethylene-vinyl alcohol copolymer, a partially saponified product of an ethylene-vinyl acetate copolymer, and a polyvinyl alcohol. For example, as the component (A), the polyamide or ethylene-vinyl alcohol copolymer may be used solely, or the polyamide and at least one member selected from the group consisting of the ethylene-vinyl alcohol copolymer, the partially saponified product of the ethylene-vinyl acetate copolymer and the polyvinyl alcohol may be used in combination. In case of using in combination, the polyamide and the ethylene-vinyl alcohol copolymer are preferably used in combination. If the polyamide and the ethylene-vinyl alcohol copolymer are used in combination, the obtained golf ball constituent member has better durability while keeping high resilience.

In case of using the polyamide and at least one member (in particular, the ethylene-vinyl alcohol copolymer) selected from the group consisting of the ethylene-vinyl alcohol copolymer, the partially saponified product of the ethylene-vinyl acetate copolymer and the polyvinyl alcohol in combination as the component (A), a mass ratio (the polyamide/at least one member selected from the group consisting of the ethylene-vinyl alcohol copolymer, the partially saponified product of the ethylene-vinyl acetate copolymer and the polyvinyl alcohol) is preferably 2 or more, more preferably 4 or more, and even more preferably 6 or more, and is preferably 20 or less, more preferably 15 or less, and even more preferably 10 or less.

The amount of the component (A) in the resin component of the golf ball resin composition is preferably 5 mass % or more, more preferably 10 mass % or more, and even more preferably 20 mass % or more, and is preferably 95 mass % or less, more preferably 85 mass % or less, even more preferably 75 mass % or less, and most preferably 65 mass % or less. If the amount of the component (A) is 5 mass % or more, the effects of high elasticity and high rigidity based on the component (A) is further exerted, and if the amount of the component (A) is 95 mass % or less, the obtained constituent member has better durability.

Next, the component (B) used in the present invention will be described. The component (B) contains at least one resin component selected from the group consisting of (b-1) a binary copolymer composed of an olefin and an α,β-unsaturated carboxylic acid having 3 to 8 carbon atoms (hereinafter, sometimes simply referred to as "(b-1) a binary copolymer"), (b-2) a metal ion-neutralized product of a binary copolymer composed of an olefin and an α,β-unsaturated carboxylic acid having 3 to 8 carbon atoms (hereinafter, sometimes simply referred to as "(b-2) a binary ionomer resin"), (b-3) a ternary copolymer composed of an olefin, an α,β-unsaturated carboxylic acid having 3 to 8 carbon atoms and an α,β-unsaturated carboxylic acid ester (hereinafter, sometimes simply referred to as "(b-3) a ternary copolymer"), and (b-4) a metal ion-neutralized product of a ternary copolymer composed of an olefin, an α,β-unsaturated carboxylic acid having 3 to 8 carbon atoms and an α,β-unsaturated carboxylic acid ester (hereinafter, sometimes simply referred to as "(b-3) a ternary ionomer resin"). It is noted that (b-1) the binary copolymer, (b-2) the binary ionomer resin, (b-3) the ternary copolymer and (b-4) the ternary ionomer resin may be used solely, or at least two of them may be used in combination.

The component (b-1) and the component (b-3) are non-ionic copolymers in which carboxyl groups are not neutralized.

The amount of the α,β-unsaturated carboxylic acid component having 3 to 8 carbon atoms in (b-1) the binary copolymer or (b-3) the ternary copolymer is preferably 4 mass % or more, more preferably 5 mass % or more, and from the viewpoint of achieving high stiffness, is even more preferably 16 mass % or more, most preferably 18 mass % or more. In addition, the upper limit of the amount is preferably 30 mass %, more preferably 25 mass %, without any limitation.

The melt flow rate (hereinafter, sometimes referred to as "MFR") (190° C., 2.16 kgf) of (b-1) the binary copolymer or (b-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, and even more preferably 1,300 g/10 min or less. If the MFR (190° C., 2.16 kgf) of (b-1) the binary copolymer or (b-3) the ternary copolymer is 5 g/10 min or more, the golf ball resin composition has better fluidity, and thus it is easy to mold the thin constituent member. In addition, if the MFR (190° C., 2.16 kgf) of (b-1) the binary copolymer or (b-3) the ternary copolymer is 1,700 g/10 min or less, the obtained golf ball has better durability.

The component (b-2) and the component (b-4) are ionomer resins in which at least a part of carboxyl groups in the copolymers is neutralized with a metal ion.

As (b-2) the binary ionomer resin and (b-4) the ternary ionomer resin, an ionomer resin which has been neutralized in advance may be used, or a blend of a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester, and a metal compound may be used. This is because when molding, carboxyl groups of the binary copolymer composed of an olefin and an α,β-unsaturated carboxylic acid having 3 to 8 carbon atoms and/or the ternary copolymer composed of an olefin, an α,β-unsaturated carboxylic acid having 3 to 8 carbon atoms and an α,β-unsaturated carboxylic acid ester are neutralized by the metal compound to form an ionomer resin. Examples of the metal compound for neutralizing the carboxyl groups of the binary copolymer and/or the ternary copolymer include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

The amount of the α,β-unsaturated carboxylic acid component having 3 to 8 carbon atoms in (b-2) the binary ionomer resin or (b-4) the ternary ionomer resin is preferably 2 mass % or more, more preferably 3 mass % or more, and from the viewpoint of achieving high stiffness, is even more preferably 16 mass % or more, most preferably 17 mass % or more. In addition, the upper limit of the amount is preferably 30 mass %, more preferably 25 mass %, without any limitation.

Examples of the metal ion for neutralizing at least a part of carboxyl groups of the component (b-2) and the component (b-4) include monovalent metal ions such as sodium, potassium, lithium and the like; divalent metals ions such as magnesium, calcium, zinc, barium, cadmium and the like; trivalent metals ions such as aluminum and the like; and other ions such as tin, zirconium and the like.

The neutralization degree of (b-2) the binary ionomer resin is preferably 15 mole % or more, more preferably 20 mole % or more, and is preferably 90 mole % or less, more preferably 85 mole % or less. If the neutralization degree is 15 mole % or more, the obtained golf ball has better resilience and durability, and if the neutralization degree is 90 mole % or less, the golf ball resin composition has better fluidity (better moldability).

The neutralization degree of (b-4) the ternary ionomer resin is preferably 20 mole % or more, more preferably 30 mole % or more, and is preferably 90 mole % or less, more preferably 85 mole % or less. If the neutralization degree is 20 mole % or more, the golf ball formed from the golf ball resin composition has better resilience and durability, and if the neutralization degree is 90 mole % or less, the golf ball resin composition has better fluidity (better moldability).

It is noted that the neutralization degree of the ionomer resin may be calculated by the following expression.

Neutralization degree of ionomer resin (mole %)=100×(mole number of neutralized carboxyl groups in ionomer resin/mole number of all carboxyl groups in ionomer resin)

The flexural modulus of (b-2) the binary ionomer resin is preferably 140 MPa or more, more preferably 150 MPa or more, even more preferably 160 MPa or more, and most preferably 200 MPa or more, and is preferably 550 MPa or less, more preferably 500 MPa or less, and even more preferably 450 MPa or less. If the flexural modulus falls within the above range, the golf ball has better durability while showing excellent flight performance.

The slab hardness of (b-2) the binary ionomer resin is preferably 50 or more, more preferably 55 or more, and even more preferably 60 or more in Shore D hardness, and is preferably 75 or less, more preferably 73 or less, and even more preferably 70 or less in Shore D hardness. If the slab hardness is 50 or more in Shore D hardness, the obtained constituent member has high hardness. In addition, if the slab hardness is 75 or less in Shore D hardness, the obtained constituent member does not become excessively hard and thus the golf ball has better durability.

The MFR (190° C., 2.16 kgf) of (b-2) the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the MFR (190° C., 2.16 kgf) of (b-2) the binary ionomer resin is 0.1 g/10 min or more, the golf ball resin composition has better fluidity, and thus, for example, a thin constituent member can be obtained. In addition, if the MFR (190° C., 2.16 kgf) of (b-2) the binary ionomer resin is 30 g/10 min or less, the obtained golf ball has better durability.

The flexural modulus of (b-4) the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the flexural modulus falls within the above range, the golf ball has better durability while showing excellent flight performance.

The slab hardness of (b-4) the ternary ionomer resin is preferably 20 or more, more preferably 25 or more, and even more preferably 30 or more in Shore D hardness, and is preferably 70 or less, more preferably 65 or less, and even more preferably 60 or less in Shore D hardness. If the slab hardness is 20 or more in Shore D hardness, the obtained constituent member does not become excessively soft and thus the golf ball has better resilience. In addition, if the slab hardness is 70 or less in Shore D hardness, the obtained constituent member does not become excessively hard and thus golf ball has better durability.

The MFR (190° C., 2.16 kgf) of (b-4) the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the MFR (190° C., 2.16 kgf) of (b-4) the ternary ionomer resin is 0.1 g/10 min or more, the golf ball resin composition has better fluidity and thus a thin constituent member can be molded. In addition, if the MFR (190° C., 2.16 kgf) of (b-4) the ternary ionomer resin is 20 g/10 min or less, the obtained golf ball has better durability.

The olefin constituting the components (b-1), (b-2), (b-3) and (b-4) is preferably an olefin having 2 to 8 carbon atoms. Examples of the olefin include ethylene, propylene, butene, pentene, hexene, heptene and octene, and ethylene is particularly preferred.

Examples of the α,β-unsaturated carboxylic acid having 3 to 8 carbon atoms constituting the components (b-1), (b-2), (b-3) and (b-4) include acrylic acid, methacrylic acid, fumaric acid, maleic acid and crotonic acid, and acrylic acid or methacrylic acid is particularly preferred.

Examples of the α,β-unsaturated carboxylic acid ester constituting the components (b-3) and (b-4) include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

As (b-1) the binary copolymer, a binary copolymer composed of ethylene and (meth)acrylic acid is preferable. As (b-2) the binary ionomer resin, a metal ion-neutralized product of an ethylene-(meth)acrylic acid binary copolymer is preferable. As (b-3) the ternary copolymer, a ternary copolymer composed of ethylene, (meth)acrylic acid and (meth)acrylic acid ester is preferable. As (b-4) the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

Examples of (b-1) the binary copolymer include Nucrel (registered trademark) N1050H, N2050H, AN4318, N1110H, N0200H (available from Mitsui-Du Pont Polychemicals Co., Ltd.); Primacor (registered trademark) 59801 (available from Dow Chemical Company); and so on. Examples of (b-3) the ternary copolymer include Nucrel AN4318, AN4319 (available from Mitsui-Du Pont Polychemicals Co., Ltd.); Nucrel AE (available from E.I. du Pont de Nemours and Company); and Primacor (registered trademark) AT310, AT320 (available from Dow Chemical Company).

Examples of (b-2) the binary ionomer resin include Himilan (registered trademark) 1555 (Na), 1557 (Zn), 1605 (Na), 1706 (Zn), 1707 (Na), AM7311 (Mg), AM7329 (Zn), AM7337 (Na) (available from Mitsui-Du Pont Polychemicals Co., Ltd.); Surlyn (registered trademark) 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) (available from E.I. du Pont de Nemours and Company); and Iotek (registered trademark) 8000 (Na), 8030 (Na), 7010 (Zn), 7030 (Zn) (available from ExxonMobil Chemical Corporation). It is noted that Na, Zn, Li, Mg and the like described in the parentheses after the trade names indicate metal types of neutralizing metal ions of the binary ionomer resins.

Examples of (b-4) the ternary ionomer resin include Himilan AM7327 (Zn), 1855 (Zn), 1856 (Na), AM7331 (Na) (available from Mitsui-Du Pont Polychemicals Co., Ltd.); Surlyn 6320 (Mg), 8120 (Na), 8320 (Na), 9320 (Zn), 9320W (Zn), HPF 1000 (Mg), HPF 2000 (Mg) (available from E.I. du Pont de Nemours and Company); and Iotek 7510 (Zn), 7520 (Zn) (available from ExxonMobil Chemical Corporation).

The golf ball resin composition preferably contains (b-2) the binary ionomer resin and/or (b-4) the ternary ionomer resin as the component (B), and more preferably contains (b-2) the binary ionomer resin as the component (B). As (b-2) the binary ionomer resin, a mixture of a sodium-neutralized binary ionomer resin and a zinc-neutralized binary ionomer resin is preferably used. If the mixture is used, a better balance between the resilience and the durability is easily struck.

The amount of the component (B) in the resin component of the golf ball resin composition is preferably 5 mass % or more, more preferably 15 mass % or more, even more preferably 25 mass % or more, and most preferably 35 mass % or more, and is preferably 95 mass % or less, more preferably 90 mass % or less, even more preferably 80 mass % or less, and most preferably 70 mass % or less. If the amount of the component (B) is 5 mass % or more, the resin composition has higher rebound resilience, and if the amount of the component (B) is 95 mass % or less, the effect of adding the other resin component (such as the component (A) or the like) is exerted.

The mass ratio ((A)/(B)) of the component (A) to the component (B) is preferably 5/95 or more, more preferably 10/90 or more, even more preferably 15/85 or more, and most preferably 20/80 or more, and is preferably 95/5 or less, more preferably 80/20 or less, even more preferably 70/30 or less, and most preferably 45/55 or less. If the mass ratio of the component (A) to the component (B) falls with the above range, the golf ball has better resilience as well as better durability.

The golf ball resin composition according to the present invention may further contain another resin component as a resin component, in addition to the component (A) and the component (B), unless another resin component impairs the effect of the present invention. The amount of another resin component in all the resin components of the golf ball resin composition is preferably 20 mass % or less, more preferably 15 mass % or less, even more preferably 10 mass % or less, and most preferably 5 mass % or less. It is noted that, in the present invention, it is also preferred that the resin component consists of the component (A) and the component (B).

Next, (C) the fatty acid metal salt having 18 or less carbon atoms used in the present invention will be explained. (C) The fatty acid metal salt having 18 or less carbon atoms is preferably a metal salt of an aliphatic carboxylic acid. The fatty acid component of the fatty acid metal salt may be a saturated fatty acid or an unsaturated fatty acid. In addition, the fatty acid component may be any one of a linear fatty acid, a branched fatty acid and an alicyclic fatty acid. The number of carboxyl groups in one molecule of the fatty acid component is preferably 2 or less, and more preferably 1, without any limitation.

The fatty acid component constituting the component (C) is not particularly limited, as long as it is a fatty acid component having 18 or less carbon atoms. However, the fatty acid component preferably has 4 or more carbon atoms. This is because if the fatty acid component has less carbon atoms, problems such as toxicity and odor occur. In addition, from the viewpoint of achieving a greater durability improvement effect for the golf ball, the number of carbon atoms of the fatty acid component is more preferably 8 or more, even more preferably 12 or more, and most preferably 15 or more.

Specific examples of the saturated fatty acid component (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), and octadecanoic acid (C18).

Specific examples of the saturated fatty acid component (Common name) include butyric acid (C4), valeric acid (C5), caproic acid (C6), enanthic acid (C7), caprylic acid (C8), pelargonic acid (C9), capric acid (C10), undecylic acid (C11), lauric acid (C12), tridecylic acid (C13), myristic acid (C14), pentadecylic acid (C15), palmitic acid (C16), margaric acid (C17), and stearic acid (C18).

Specific examples of the unsaturated fatty acid component (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), and octadecenoic acid (C18).

Specific examples of the unsaturated fatty acid component (Common name) include myristoleic acid (C14, monounsaturated fatty acid), palmitoleic acid (C16, monounsaturated fatty acid), stearidonic acid (C18, tetraunsaturated fatty acid), vaccenic acid (C18, monounsaturated fatty acid), oleic acid (C18, monounsaturated fatty acid), elaidic acid (C18, monounsaturated fatty acid), linoleic acid (C18, diunsaturated fatty acid), α-linolenic acid (C18, triunsaturated fatty acid), γ-linolenic acid (C18, triunsaturated fatty acid), pinolenic acid (C18, triunsaturated fatty acid), α-eleostearic acid (C18, triunsaturated fatty acid), and β-eleostearic acid (C18, triunsaturated fatty acid).

The fatty acid component of the fatty acid metal salt used in the present invention preferably further has at least one substituent group selected from the group consisting of a hydroxyl group, a halogen (e.g. fluorine, chlorine, bromine, iodine), and a dialkylamino group. If the fatty acid metal salt having the above substituent group is used, a better balance between the resilience and the durability is struck. Among them, from the viewpoint of achieving a greater durability improvement effect for the golf ball, the hydroxyl group is preferred as the above substituent group. The fatty acid metal salt preferably has at least one substituent group among these substituent groups, and may have a plurality of substituent groups. In addition, the fatty acid metal salt may have a plurality of types of substituent groups. It is noted that in the case that the substituent group has a carbon atom (e.g. dialkylamino group), the carbon atom of the substituent group is not included in the number of carbon atoms of the component (C).

Preferable examples of the fatty acid component having the substituent group include 9-hydroxystearic acid (9-hydroxyoctadecanoic acid), 10-hydroxystearic acid (10-hydroxyoctadecanoic acid), 12-hydroxystearic acid (12-hydroxyoctadecanoic acid), 18-hydroxystearic acid (18-hydroxyoctadecanoic acid), Jalapinolic acid (11-hydroxyhexadecanoic acid), 9,10-dihydroxyoctadecanoic acid, 10,12-dihydroxyoctadecanoic acid, ipurolic acid (3,11-dihydroxytetradecanoic acid), aleuritic acid (9,10,16-trihydroxyhexadecanoic acid), ustilic acid (2,15,16-trihydroxyhexadecanoic acid), ricinoleic acid (12-hydroxy-cis-9-octadecenoic acid), ricinelaidic acid (12-hydroxy-trans-9-octadecenoic acid), 10-hydroxy-cis-12-octadecenoic acid, 10-hydroxy-cis-15-octadecenoic acid, 10-hydroxy-cis-6-octadecenoic acid, ambrettolic acid (16-hydroxy-7-hexadecenoic acid), 10-hydroxy-trans-11-octadecenoic acid, 10-hydroxy-cis-12,cis-15-octadecadienoic acid, 10-hydroxy-cis-6,cis-12-octadecadienoic acid, 10-hydroxy-cis-6,cis-15-octadecadienoic acid, 10-hydroxy-trans-11,cis-15-octadecadienoic acid, coriolic acid (13-hydroxy-9,11-octadecadienoic acid), 10-hydroxy-cis-6,trans-11-octadecadienoic acid, 10-hydroxy-cis-6,trans-11,cis-15-octadecatrienoic acid, kamlolenic acid (18-hydroxy-9,11,13-octadecatrienoic acid), 10-hydroxy-cis-6,cis-12,cis-15-octadecatrienoic acid, ximenynic acid (8-hydroxy-trans-11-octadecen-9-ynoic acid), and isanolic acid (8-hydroxy-17-octadecen-9,11-diynoic acid). Among them, from the viewpoint of achieving a greater durability improvement effect for the golf ball, 12-hydroxystearic acid and ricinoleic acid are preferred.

The fatty acid component may be used solely, or at least two of them may be used in combination.

Examples of the metal ion component constituting (C) the fatty acid metal salt include a monovalent metal ion such as sodium, potassium, lithium, silver or the like; a divalent metal ion such as magnesium, calcium, zinc, barium, cadmium, copper, cobalt, nickel, manganese or the like; a trivalent metal ion such as aluminum, iron or the like; and other metal ions such as tin, zirconium, titanium or the like. The cation component may be used solely or as a mixture of at least two of them. Among them, aluminum, sodium, zinc, magnesium and calcium are preferable. The metal ion component may be used solely, or at least two of them may be used in combination.

In the present invention, it is preferred that (C) the fatty acid metal salt is at least one member selected from the group consisting of aluminum 12-hydroxystearate, sodium 12-hydroxystearate, zinc 12-hydroxystearate, and zinc ricinoleate.

The amount of the component (C) is preferably 0.1 part by mass or more, more preferably 0.2 part by mass or more, and even more preferably 0.5 part by mass or more, and is preferably less than 5 parts by mass, more preferably 4.5 parts by mass or less, and even more preferably 4.0 parts by mass or less, with respect to 100 parts by mass of the total amount of the component (A) and the component (B) in the golf ball resin composition. If the amount of the component (C) is 0.1 part by mass or more, the golf ball has a greater durability improvement effect. In addition, the golf ball constituent member is easily molded, since the golf ball resin composition has better fluidity. On the other hand, if the amount of the component (C) is less than 5 parts by mass, the durability is better.

The golf ball resin composition may further contain a pigment component such as a white pigment (e.g. titanium oxide) and a blue pigment, a weight adjusting agent, a dispersant, an antioxidant, an ultraviolet absorber, a light stabilizer, a fluorescent material or a fluorescent brightener. Examples of the weight adjusting agent include an inorganic filler such as zinc oxide, barium sulfate, calcium carbonate, magnesium oxide, tungsten powder, molybdenum powder, and the like.

It is preferred that the golf ball resin composition according to the present invention does not contain, for example, a metal filler whose surface is organically treated, an organically modified layered silicate, or the like. If the golf ball resin composition contains these fillers, the fluidity thereof may be lowered.

The golf ball resin composition according to the present invention can be obtained, for example, by dry blending the component (A), the component (B) and the component (C). Further, the dry blended mixture may be extruded into a pellet form. Dry blending is preferably carried out by using, for example, a mixer capable of blending raw materials in a pellet form, and more preferably carried out by using a tumbler type mixer. Extruding can be carried out by using a conventional extruder such as a single-screw extruder, a twin-screw extruder, and a twin-single extruder.

The MFR (240° C., 2.16 kgf) of the golf ball resin composition according to the present invention is preferably 5 g/10 min or more, more preferably 10 g/10 min or more, and even more preferably 15 g/10 min or more, and is preferably 100 g/10 min or less, more preferably 80 g/10 min or less, even more 60 g/10 min or less, and most preferably 40 g/10 min or less. If the MFR of the golf ball resin composition falls within the above range, the obtained golf ball has better moldability as well as better durability.

The slab hardness of the golf ball resin composition according to the present invention is preferably 50 or more, more preferably 55 or more, and even more preferably 60 or more in Shore D hardness, and is preferably 80 or less, more preferably 78 or less, and even more preferably 75 or less in Shore D hardness. If the slab hardness is 50 or more in Shore D hardness, the golf ball resin composition has higher rebound resilience, and thus the obtained golf ball travels a greater flight distance on driver shots. On the other hand, if the slab hardness is 80 or less in Shore D hardness, the obtained golf ball has better shot feeling as well as better durability. Herein, the slab hardness of the golf ball resin composition is a slab hardness of the golf ball resin composition molded into a sheet form.

[Golf Ball]

Examples of the construction of the golf ball according to the present include, but are not limited to, a one-piece golf ball, a two-piece golf ball composed of a core and a single-layered cover covering the core; and a multi-piece golf ball (such as a three-piece golf ball, four-piece golf ball, five-piece golf ball and so on) composed of a core, one or more intermediate layers covering the core and a cover covering the intermediate layers.

The constituent member formed from the above-described golf ball resin composition may be any one of the core, the intermediate layer and the cover, and is preferably the intermediate layer. It is noted that the part of the golf ball other than the constituent member formed from the above-described golf ball resin composition may be formed from a conventional material.

Next, the golf ball according to the present invention will be explained in detail, with reference to the preferable embodiment which is a golf ball comprising a core, one or more intermediate layers covering the core, and a cover covering the intermediate layers, wherein at least one layer of the intermediate layers is formed from the golf ball resin composition according to the present invention.

(Core)

The core may be formed by using a conventional rubber composition (hereinafter, sometimes simply referred to as "core rubber composition"). For example, the core may be formed by heat pressing a rubber composition containing a base rubber, a co-crosslinking agent, and a crosslinking initiator.

As the base rubber, particularly preferred is a high cis-polybutadiene having a cis-bond which is beneficial to the resilience in an amount of 40 mass % or more, preferably 70 mass % or more, and more preferably 90 mass % or more. As the co-crosslinking agent, an α,β-unsaturated carboxylic acid having 3 to 8 carbon atoms or a metal salt thereof is preferred, and acrylic acid metal salt and methacrylic acid metal salt are more preferred. As the metal constituting the metal salt, zinc, magnesium, calcium, aluminum and sodium are preferred, and zinc is more preferred. The amount of the co-crosslinking agent is preferably 20 parts by mass or more and 50 parts by mass or less with respect to 100 parts by mass of the base rubber. When the α,β-unsaturated carboxylic acid having 3 to 8 carbon atoms is used as the co-crosslinking agent, a metal compound (e.g. magnesium oxide) is preferably blended. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

The core rubber composition may further contain an organic sulfur compound. Examples of the organic sulfur compound include diphenyl disulfides, thiophenols, and thionaphthols. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, any one of an aliphatic carboxylic acid and an aromatic carboxylic acid (such as benzoic acid) may be used. The amount of the carboxylic acid and/or the salt thereof is 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like appropriately, in addition to the base rubber, the co-crosslinking agent, the crosslinking initiator and the organic sulfur compound.

Conditions for molding the core rubber composition by a heat pressing method may be set appropriately in accordance with the formulation of the core rubber composition. Generally, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

The core preferably has a spherical shape. The spherical core preferably has a diameter of 34.8 mm or more, more preferably 35.0 mm or more, and even more preferably 35.2 mm or more, and preferably has a diameter of 41.2 mm or less, more preferably 41.0 mm or less, and even more preferably 40.8 mm or less. If the spherical core has a diameter of 34.8 mm or more, the thickness of the intermediate layer or the cover does not become too thick and thus the resilience becomes better. On the other hand, if the spherical core has a diameter of 41.2 mm or less, the thickness of the intermediate layer or the cover does not become too thin and thus the intermediate layer or the cover functions better.

When the spherical core has a diameter ranging from 34.8 mm to 41.2 mm, the compression deformation amount of the spherical core (shrinking amount of the core along the compression direction) when applying a load from 98 N as an initial load to 1275 N as a final load to the spherical core is preferably 1.90 mm or more, more preferably 2.00 mm or more, and even more preferably 2.10 mm or more, and is preferably 4.00 mm or less, more preferably 3.90 mm or less, and even more preferably 3.80 mm or less. If the compression deformation amount is 1.90 mm or more, the shot feeling of the golf ball becomes better, and if the compression deformation amount is 4.00 mm or less, the resilience of the golf ball becomes better.

The spherical core preferably has a surface hardness of 45 or more, more preferably 50 or more, and even more preferably 55 or more in Shore D hardness, and the spherical core preferably has a surface hardness of 65 or less, more preferably 62 or less, even more preferably 60 or less in Shore D hardness. If the surface hardness of the core is 45 or more in Shore D hardness, the core does not become excessively soft and thus the resilience thereof becomes better. In addition, if the surface hardness of the core is 65 or less in Shore D hardness, the core does not become excessively hard and thus the shot feeling thereof becomes better.

The spherical core preferably has a center hardness of 30 or more, more preferably 32 or more, and even more preferably 35 or more in Shore D hardness. If the center hardness of the spherical core is less than 30 in Shore D hardness, the spherical core becomes so soft that the resilience thereof may be lowered. On the other hand, the spherical core preferably has a center hardness of 50 or less, more preferably 48 or less, and even more preferably 46 or less in Shore D hardness. If the center hardness of the spherical core exceeds 50 in Shore D hardness, the spherical core becomes so hard that the shot feeling thereof tends to be lowered. In the present invention, the center hardness of the spherical core is a hardness measured with a Shore D type spring hardness tester at the central point of a cut plane which is obtained by equally cutting the spherical core into two hemispheres.

In addition, it is also preferred that the surface hardness of the spherical core is larger than the center hardness of the spherical core. If the surface hardness of the spherical core is larger than the center hardness of the spherical core, the obtained golf ball shows a high launch angle and a low spin rate on driver shots. The golf ball showing a high launch angle and a low spin rate on driver shots travels a great flight distance. The hardness difference (surface hardness−center hardness) between the surface hardness of the spherical core and the center hardness of the spherical core is preferably 4 or more, more preferably 7 or more in Shore D hardness, and is preferably 40 or less, more preferably 30 or less, and even more preferably 25 or less in Shore D hardness. If the hardness difference is excessively high, the durability tends to be lowered.

(Intermediate Layer)

In the case that the golf ball according to the present invention comprises two or more intermediate layers, it is preferred that at least one intermediate layer is formed from the golf ball resin composition according to the present invention. In this case, it is preferred that the outermost intermediate layer is formed from the golf ball resin composition according to the present invention. In addition, it is also preferred that all the intermediate layers are formed from the golf ball resin composition according to the present invention.

In the case that the intermediate layer has a plurality of layers, examples of the intermediate layer material (hereinafter, sometimes referred to as "other intermediate layer material") used for the intermediate layer other than the intermediate layer formed from the golf ball resin composition according to the present invention include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include the component (b-2) and the component (b-4) described above. The intermediate layer may further contain a weight adjusting agent such as barium sulfate and tungsten, an antioxidant, and a pigment.

Examples of the method for molding the intermediate layer include, but are not limited to, a method which comprises molding the intermediate layer material (the above-described golf ball resin composition or other intermediate layer material) into a hemispherical half shell beforehand, covering the spherical body with two of the half shells and performing the compression molding; and a method which comprises injection molding the intermediate layer material directly onto the spherical core to cover the spherical core.

The thickness of the intermediate layer is preferably 0.3 mm or more, more preferably 0.4 mm or more, and even more preferably 0.5 mm or more, and is preferably 4.0 mm or less, more preferably 3.0 mm or less, even more preferably 2.5 mm or less, and most preferably 2.0 mm or less. If thickness of the intermediate layer is 0.3 mm or more, the intermediate layer is easily molded and the obtained golf ball has better durability. In addition, if the thickness of the intermediate layer is 4.0 mm or less, the obtained golf ball has better resilience and shot feeling. It is noted that when the intermediate layer has a plurality of layers, it is preferred that the total thickness of the intermediate layers falls within the above range.

(Cover)

The cover of the golf ball according to the present invention is formed from a cover composition containing a resin component. Examples of the resin component include, but are not limited to, an ionomer resin, polyurethane, polyamide, polyester, and polystyrene, and the polyurethane and the ionomer resin are preferred.

Specific examples of the resin component include an ionomer resin having a trade name of "Himilan (registered trademark)" available from Mitsui-Du Pont Polychemicals Co., Ltd; a thermoplastic polyurethane elastomer having a trade name of "Elastollan (registered trademark)" available from BASF Japan Ltd; a thermoplastic polyamide elastomer having a trade name of "Pebax (registered trademark) available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" or a thermoplastic polyester elastomer having a trade name of "Primalloy" available from Mitsubishi Chemical Corporation.

In addition to the above resin component, the cover composition may further contain a pigment component such as a white pigment (e.g. titanium oxide), a blue pigment and a red pigment; a weight adjusting agent such as calcium carbonate and barium sulfate; a dispersant; an antioxidant; an ultraviolet absorber; a light stabilizer; a fluorescent material or a fluorescent brightener; and the like, unless they impair the performance of the cover.

The slab hardness of the cover composition is preferably 20 or more, more preferably 25 or more, and even more preferably 30 or more in Shore D hardness, and is preferably 65 or less, more preferably 60 or less, and even more preferably 55 or less in Shore D hardness. If the slab hardness of the cover composition is 20 or more in Shore D hardness, the golf ball has better durability. In addition, if the slab hardness of the cover composition is 65 or less in Shore D hardness, the golf ball has better shot feeling. Herein, the slab hardness of the cover composition is a slab hardness of the cover composition molded into a sheet form.

Examples of the method for molding the cover include a method which comprises molding the cover composition into a hollow shell, covering the spherical body having the core and the intermediate layer with a plurality of the hollow shells and performing the compression molding (preferably a method which comprises molding the cover composition into a hollow half-shell, covering the spherical body having the core and the intermediate layer with two of the half-shells and performing the compression molding); and a method which comprises injection molding the cover composition directly onto the spherical body having the core or and the intermediate layer.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and the wear resistance of the cover may deteriorate.

When molding the cover, concave portions called "dimple" are usually formed on the surface of the cover. The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is preferably, but not limited to, 5 µm or more, more preferably 7 µm or more, and is preferably 50 µm or less, more preferably 25 µm or less, and even more preferably 18 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball according to the present invention preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes greater.

The FIGURE is a partially cutaway view of a golf ball 1 according to one embodiment of the present invention. The golf ball 1 comprises a spherical core 2, an intermediate layer 3 disposed outside the spherical core 2, and a cover 4 disposed outside the intermediate layer 3. A plurality of dimples 41 are formed on the surface of the cover 4. Other portions than the dimples 41 on the surface of the cover 4 are land 42. The intermediate layer 3 is formed from the above-described golf ball resin composition.

EXAMPLES

Next, the present invention will be described in detail by way of examples. However, the present invention is not limited to the examples described below. Various changes and modifications without departing from the spirit of the present invention are included in the scope of the present invention.

[Measuring Conditions]
(1) Melt Flow Rate (MFR) (g/10 Min)

MFR was measured with a flow tester (Shimadzu flow tester CFT-100C available from Shimadzu Corporation), in accordance with JIS K7210. It is noted that the measurement was conducted under conditions of a measuring temperature of 240° C. and a load of 2.16 kg.

(2) Durability

A W #1 driver provided with a metal head (XXIO S, loft angel: 11°, available from Dunlop Sports Limited) was installed on a swing robot M/C available from Golf Laboratories, Inc. Each golf ball was hit repeatedly at a head speed of 45 m/sec until the golf ball was broken, and the hitting times when the golf ball was broken were counted. It is noted that sometimes crack occurred in the intermediate layer even if exteriorly the golf ball was not broken. In this case, judgment regarding whether the golf ball was broken or not was made based on the difference in the deformation or hitting sound of the golf ball. The hitting times of the golf ball No. 17 was defined as 100, and the durability of each golf ball was represented by converting the hitting times of each golf ball into this index. A greater value means better durability of the golf ball.

(3) Resilience

A metal cylindrical object with a mass of 198.4 g was allowed to collide with each golf ball at a speed of 45 m/sec, and the speeds of the cylindrical object and the golf ball before and after the collision were measured. Based on these speeds and the mass of each object, coefficient of restitution for each golf ball was calculated. The measurement was conducted using twelve samples for each golf ball, and the average value thereof was adopted as the coefficient of restitution of that golf ball. It is noted that the coefficient of restitution of the golf ball No. 17 was defined as 100, and the coefficient of restitution of each golf ball was represented by converting the coefficient of restitution of each golf ball into this index.

(4) Slab Hardness (Shore D Hardness)

Sheets with a thickness of about 2 mm were produced by injection molding the cover composition and the golf ball resin composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore 0".

(5) Core Hardness (Shore D Hardness)

The hardness of the core was measured with a type P1 auto loading durometer available from Kobunshi Keiki Co., Ltd., provided with a Shore D type spring hardness tester prescribed in ASTM-D2240. The Shore D hardness measured at the surface of the core was adopted as the surface hardness of the core. In addition, the Shore D hardness measured at the central point of a cut plane which was obtained by cutting the core into two hemispheres was adopted as the center hardness of the core.

(6) Compression Deformation Amount (Mm)

A compression deformation amount of the core (a shrinking amount of the core along the compression direction), when applying a load from an initial load of 98 N to a final load of 1275 N to the core, was measured.

[Preparation of Golf Ball Resin Composition]

The materials having the formulations shown in Tables 1 and 2 were extruded with a twin-screw kneading extruder to prepare the golf ball resin compositions in a pellet form. The extruding conditions were a screw diameter of 30 mm, a screw rotational speed of 200 rpm, and screw L/D=30, and the mixture was heated to 220° C. to 235° C. at the die position of the extruder.

TABLE 1

| | | | | | Golf ball No. | 1 | 2 | 3 | 4 | 5 | 6 | 7 | 8 | 9 |
|---|---|---|---|---|---|---|---|---|---|---|---|---|---|---|
| Intermediate layer | Global resin composition | Formulation (parts by mass) | Resin component | (A) | Polyamide 610 | 45 | 45 | 45 | — | 30 | — | 40 | 35 | 45 |
| | | | | | Polyamide 6 | — | — | — | 45 | — | 25 | — | — | — |
| | | | | | EVOH | — | — | — | — | — | — | 5 | — | — |
| | | | | (B) | Ionomer resin A | 55 | 55 | 55 | 55 | 70 | 75 | 55 | 65 | 55 |
| | | | | | Ionomer resin B | — | — | — | — | — | — | — | — | — |
| | | | | (C) | Al 12OH stearate | 1 | — | — | 1 | 1 | 1 | 1 | — | — |
| | | | | | Na 12OH stearate | — | 1 | — | — | — | — | — | — | — |
| | | | | | Zn 12OH stearate | — | — | 1 | — | — | — | — | — | — |
| | | | | | Zn ricinoleate | — | — | — | — | — | — | — | 1 | — |
| | | | | | Na behenate | — | — | — | — | — | — | — | — | — |
| | | | | | Zn behenate | — | — | — | — | — | — | — | — | — |
| | | | | | Zn montanate | — | — | — | — | — | — | — | — | — |
| | | | | | Zn stearate | — | — | — | — | — | — | — | — | 1 |
| | | Property | | | Slab hardness (Shore D) | 71 | 71 | 71 | 74 | 70 | 70 | 72 | 70 | 71 |
| | | | | | MFR (240° C., 2.16 kgf) (g/10 min) | 11.6 | 17.8 | 15.9 | 10.7 | 13.6 | 14.5 | 19.2 | 21.2 | 13.2 |
| | | | | | Thickness (mm) | 1.0 | 1.0 | 1.0 | 1.0 | 1.0 | 1.0 | 1.0 | 1.0 | 1.0 |
| Ball | | | | | Durability | 100 | 90 | 94 | 90 | 117 | 100 | 101 | 111 | 85 |
| | | | | | Resilience | 101.7 | 101.4 | 101.4 | 101.7 | 101.2 | 101.0 | 101.3 | 101.3 | 101.7 |

TABLE 2

| | | | | | Golf ball No. | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|
| Intermediate layer | Golf ball resin composition | Formulation (parts by mass) | Resin component | (A) | Polyamide 610 | 45 | 45 | 45 | 45 | 45 | 45 | — | — | — | — | 35 | 35 | — |
| | | | | | Polyamide 6 | — | — | — | — | — | — | 35 | — | — | — | — | — | 35 |
| | | | | | EVOH | — | — | — | — | — | — | — | — | — | 15 | — | — | — |
| | | | | (B) | Ionomer resin A | 55 | 55 | 55 | 55 | 55 | 55 | 65 | 100 | — | 85 | 65 | 65 | 65 |
| | | | | | Ionomer resin B | — | — | — | — | — | — | — | — | 100 | — | — | — | — |
| | | | | (C) | Al 12OH stearate | — | — | — | — | 0.1 | 10 | — | — | — | 1 | 0.5 | 4.5 | 5.5 |
| | | | | | Na 12OH stearate | — | — | — | — | — | — | — | — | — | — | — | — | — |
| | | | | | Zn 12OH stearate | — | — | — | — | — | — | — | — | — | — | — | — | — |
| | | | | | Zn ricinoleate | — | — | — | — | — | — | — | — | — | — | — | — | — |
| | | | | | Na behenate | 1 | — | — | — | — | — | — | — | — | — | — | — | — |
| | | | | | Zn behenate | — | 1 | — | — | — | — | — | — | — | — | — | — | — |
| | | | | | Zn montanate | — | — | 1 | — | — | — | — | — | — | — | — | — | — |
| | | | | | Zn stearate | — | — | — | — | — | — | — | — | — | — | — | — | — |
| | | Property | | | Slab hardness (Shore D) | 72 | 72 | 72 | 71 | 71 | 70 | 73 | 68 | 65 | 68 | 70 | 70 | 72 |

TABLE 2-continued

| Golf ball No. | | | 10 | 11 | 12 | 13 | 14 | 15 | 16 | 17 | 18 | 19 | 20 | 21 | 22 |
|---|---|---|---|---|---|---|---|---|---|---|---|---|---|---|---|
| | erty | MFR (240° C., 2.16 kgf) (g/10 min) | 17.2 | 15.2 | 14.1 | 12.8 | 12.5 | 25.1 | 19.0 | 61.0 | 54.0 | 49.0 | 12.8 | 13.1 | 22.7 |
| Ball | | Thickness (mm) | 1.0 | 1.0 | 1.0 | 1.0 | 1.0 | 1.0 | 1.0 | 1.0 | 1.0 | 1.0 | 1.0 | 1.0 | 1.0 |
| | | Durability | 77 | 76 | 71 | 81 | 81 | 76 | 77 | 100 | 127 | 92 | 115 | 112 | 80 |
| | | Resilience | 101.8 | 101.7 | 101.8 | 101.7 | 101.7 | 101.1 | 101.3 | 100.0 | 99.8 | 100.3 | 101.6 | 101.4 | 100.9 |

The details of the materials used in Tables 1 and 2 are shown as follows.

Polyamide 610: Amilan CM2001 available from Toray Industries, Inc.

Polyamide 6: Amilan CM1017K available from Toray Industries, Inc.

Ionomer resin A: a blend of Surlyn 8150 and Surlyn 9150 (mass ratio: 50/50) available from E.I. du Pont de Nemours and Company Ionomer resin B: a blend of Himilan 1605 and Himilan AM7329 (mass ratio: 50/50) available from Du Pont-Mitsui Polychemicals Co., Ltd.

EVOH (ethylene-vinyl alcohol copolymer): Soarlite™ (bending stiffness: 2371 MPa, Shore D hardness: 87) available from The Nippon Synthetic Chemical Industry Co., Ltd.

Aluminum 12-hydroxy (OH) stearate: AS-6 available from Nitto Kasei Kogyo K.K.

Sodium 12-hydroxy (OH) stearate: NS-6 available from Nitto Kasei Kogyo K.K.

Zinc 12-hydroxy (OH) stearate: ZS-6 available from Nitto Kasei Kogyo K.K.

Zinc ricinoleate (C18): available from Nitto Kasei Kogyo K.K.

Sodium behenate (C22): NS-7 available from Nitto Kasei Kogyo K.K.

Zinc behenate (C22): ZS-7 available from Nitto Kasei Kogyo K.K.

Zinc montanate (C28): ZS-8 available from Nitto Kasei Kogyo K.K.

Zinc stearate (C18): Zn-st available from Nitto Kasei Kogyo K.K.

[Production of Golf Ball]

(1) Production of Core

The rubber composition having the formulation shown in Table 3 was kneaded and heat pressed in upper and lower molds, each having a hemispherical cavity, at 170° C. for 30 minutes to produce cores.

TABLE 3

| Core composition | Formulation (parts by mass) |
|---|---|
| Polybutadiene rubber | 100 |
| Zinc acrylate | 39 |
| Zinc oxide | 5 |
| Barium sulfate | Appropriate amount* |
| Diphenyldisulfide | 0.5 |
| Dicumyl peroxide | 0.8 |
| Diameter (mm) | 39.7 |
| Surface hardness (Shore D) | 58 |
| Center hardness (Shore D) | 41 |
| Compression deformation amount (mm) | 2.7 |

*) As to the amount of barium sulfate, adjustment was made such that the golf ball had a mass of 45.3 g.

Polybutadiene rubber: "BR730 (high-cis polybutadiene)" available from JSR Corporation Zinc acrylate: "ZNDA-90S" available from Nihon Joryu Kogyo Co., Ltd.

Zinc oxide: "Ginrei R" available from Toho Zinc Co., Ltd.

Barium sulfate: "Barium Sulfate BD" available from Sakai Chemical Industry Co., Ltd.

Dicumyl peroxide: "PERCUMYL (registered trademark) D" available from NOF Corporation Diphenyldisulfide: available from Sumitomo Seika Chemicals Co., Ltd.

(2) Preparation of Intermediate Layer

The intermediate layer (thickness: 1 mm) was formed by injection molding the above-described golf ball resin composition on the core obtained above.

(3) Molding of Cover

According to the formulation shown in Table 4, a polyurethane elastomer in an amount of 100 parts by mass and titanium oxide in an amount of 4 parts by mass were dry blended and mixed with a twin-screw kneading extruder to obtain the cover composition in a pellet form. The extruding conditions of the cover composition were a screw diameter of 45 mm, a screw rotational speed of 200 rpm, and screw L/D=35, and the mixture was heated to 150 to 230° C. at the die position of the extruder. The obtained cover composition in the pellet form was charged into each of the depressed part of the lower mold of the mold for molding half shells, and a pressure was applied to mold the half shells. The compression molding of the half shells was conducted under the conditions of a molding temperature of 170° C., a molding time of 5 minutes and a molding pressure of 2.94 MPa. The spherical body having the spherical core covered with the intermediate layer was concentrically covered with two of the half shells, and compression molding was conducted to form the cover (thickness: 0.5 mm). The compression molding was conducted under the conditions of a molding temperature of 145° C., a molding time of 2 minutes and a molding pressure of 9.8 MPa.

TABLE 4

| Cover composition | Formulation (parts by mass) |
|---|---|
| Elastollan XNY85A | 100 |
| Titanium oxide | 4 |
| Slab hardness (Shore D) | 32 |

Elastollan XNY85A: thermoplastic polyurethane elastomer available from BASF Ltd.

The surface of the obtained golf ball body was subjected to a sandblast treatment, and a mark was formed thereon. Then, a clear paint was applied to the golf ball body, and the paint was dried in an oven of 40° C. to obtain a golf ball. Evaluation results regarding the obtained golf balls are shown in Tables 1 and 2.

It is apparent from the results shown in Tables 1 and 2 that each golf ball having an intermediate layer formed from the golf ball resin composition containing the component (A), the component (B) and the component (C) according to the present invention has excellent resilience and durability.

This application is based on Japanese Patent application No. 2016-248155 filed on Dec. 21, 2016, the content of which is hereby incorporated by reference.

The invention claimed is:

1. A golf ball resin composition containing a resin component and (C) a fatty acid metal salt having 18 or less carbon atoms,
   wherein the resin component of the golf ball resin composition consists of
   a resin component consisting of components (A) and (B),
   (A) at least one member selected from the group consisting of a polyamide, an ethylene-vinyl alcohol copolymer, a partially saponified product of an ethylene-vinyl acetate copolymer, and a polyvinyl alcohol, and
   (B) at least one resin component selected from the group consisting of
     (b-1) a binary copolymer composed of an olefin and an α,β-unsaturated carboxylic acid having 3 to 8 carbon atoms,
     (b-2) a metal ion-neutralized product of a binary copolymer composed of an olefin and an α,β-unsaturated carboxylic acid having 3 to 8 carbon atoms,
     (b-3) a ternary copolymer composed of an olefin, an α,β-unsaturated carboxylic acid having 3 to 8 carbon atoms and an α,β-unsaturated carboxylic acid ester, and
     (b-4) a metal ion-neutralized product of a ternary copolymer composed of an olefin, an α,β-unsaturated carboxylic acid having 3 to 8 carbon atoms and an α,β-unsaturated carboxylic acid ester,
   (C) the fatty acid metal salt having 18 or less carbon atoms has at least one substituent group selected from the group consisting of a hydroxyl group, a halogen and a dialkylamino group, and
   the golf ball resin composition contains the component (C) in an amount of 0.1 parts by mass or more and 4.5 parts by mass or less with respective to 100 parts by mass of a total amount of the component (A) and the component (B).

2. The golf ball resin composition according to claim 1, wherein a metal ion constituting (C) the fatty acid metal salt having 18 or less carbon atoms is at least one metal ion selected from the group consisting of aluminum ion, sodium ion, zinc ion, calcium ion and magnesium ion.

3. The golf ball resin composition according to claim 1, wherein a mass ratio ((A)/(B)) of the component (A) to the component (B) ranges from 5/95 to 95/5.

4. The golf ball resin composition according to claim 1, wherein the component (A) consists of the polyamide or consists of the polyamide and at least one member selected from the group consisting of the ethylene-vinyl alcohol copolymer, the partially saponified product of the ethylene-vinyl acetate copolymer, and the polyvinyl alcohol.

5. The golf ball resin composition according to claim 1, wherein (C) the fatty acid metal salt having 18 or less carbon atoms is at least one member selected from the group consisting of aluminum 12-hydroxystearate, sodium 12-hydroxystearate, zinc 12-hydroxystearate, and zinc ricinoleate.

6. The golf ball resin composition according to claim 1, wherein the golf ball resin composition has a melt flow rate (240° C., 2.16 kgf) ranging from 5 g/10 min to 100 g/10 min.

7. The golf ball resin composition according to claim 1, wherein the golf ball resin composition has a slab hardness ranging from 50 to 80 in Shore D hardness.

8. The golf ball resin composition according to claim 1, wherein
   component (A) includes the polyamide and at least one member selected from the group consisting of the ethylene-vinyl alcohol copolymer, the partially saponified product of the ethylene-vinyl acetate copolymer and the polyvinyl alcohol; and
   a mass ratio of the polyamide to the at least one member selected from the group consisting of the ethylene-vinyl alcohol copolymer, the partially saponified product of the ethylene-vinyl acetate copolymer and the polyvinyl alcohol (the polyamide/the at least one member selected from the group consisting of the ethylene-vinyl alcohol copolymer, the partially saponified product of the ethylene-vinyl acetate copolymer and the polyvinyl alcohol) ranges from 2 to 20.

9. A golf ball comprising a core, one or more intermediate layers covering the core, and a cover covering the one or more intermediate layers, wherein at least one layer of the intermediate layers is formed from a golf ball resin composition containing a resin component and (C) a fatty acid metal salt having 18 or less carbon atoms,
   wherein the resin component of the golf ball resin composition consists of
   a resin component consisting of components (A) and (B),
   (A) at least one member selected from the group consisting of a polyamide, an ethylene-vinyl alcohol copolymer, a partially saponified product of an ethylene-vinyl acetate copolymer, and a polyvinyl alcohol, and
   (B) at least one resin component selected from the group consisting of
     (b-1) a binary copolymer composed of an olefin and an α,β-unsaturated carboxylic acid having 3 to 8 carbon atoms,
     (b-2) a metal ion-neutralized product of a binary copolymer composed of an olefin and an α,β-unsaturated carboxylic acid having 3 to 8 carbon atoms,
     (b-3) a ternary copolymer composed of an olefin, an α,β-unsaturated carboxylic acid having 3 to 8 carbon atoms and an α,β-unsaturated carboxylic acid ester, and
     (b-4) a metal ion-neutralized product of a ternary copolymer composed of an olefin, an α,β-unsaturated carboxylic acid having 3 to 8 carbon atoms and an α,β-unsaturated carboxylic acid ester,
   (C) the fatty acid metal salt having 18 or less carbon atoms has at least one substituent group selected from the group consisting of a hydroxyl group, a halogen and a dialkylamino group, and
   the golf ball resin composition contains the component (C) in an amount of 0.1 parts by mass or more and 4.5 parts by mass or less with respective to 100 parts by mass of a total amount of the component (A) and the component (B).

10. The golf ball according to claim 9, wherein a metal ion constituting (C) the fatty acid metal salt having 18 or less carbon atoms is at least one metal ion selected from the group consisting of aluminum ion, sodium ion, zinc ion, calcium ion and magnesium ion.

11. The golf ball according to claim 9, wherein a mass ratio ((A)/(B)) of the component (A) to the component (B) ranges from 5/95 to 95/5.

12. The golf ball according to claim 9, wherein the component (A) consists of the polyamide or consists of the polyamide and at least one member selected from the group consisting of the ethylene-vinyl alcohol copolymer, the partially saponified product of the ethylene-vinyl acetate copolymer, and the polyvinyl alcohol.

13. The golf ball according to claim 9, wherein (C) the fatty acid metal salt having 18 or less carbon atoms is at least one member selected from the group consisting of aluminum 12-hydroxystearate, sodium 12-hydroxystearate, zinc 12-hydroxystearate, and zinc ricinoleate.

14. The golf ball according to claim 9, wherein the golf ball resin composition has a melt flow rate (240° C., 2.16 kgf) ranging from 5 g/10 min to 100 g/10 min.

15. The golf ball according to claim 9, wherein the golf ball resin composition has a slab hardness ranging from 50 to 80 in Shore D hardness.

16. The golf ball according to claim 9, wherein
if component (A) includes the polyamide and at least one member selected from the group consisting of the ethylene-vinyl alcohol copolymer, the partially saponified product of the ethylene-vinyl acetate copolymer and the polyvinyl alcohol;
then a mass ratio of the polyamide to the at least one member selected from the group consisting of the ethylene-vinyl alcohol copolymer, the partially saponified product of the ethylene-vinyl acetate copolymer and the polyvinyl alcohol (the polyamide/the at least one member selected from the group consisting of the ethylene-vinyl alcohol copolymer, the partially saponified product of the ethylene-vinyl acetate copolymer and the polyvinyl alcohol) ranges from 2 to 20.

* * * * *